(12) United States Patent
Schmandt

(10) Patent No.: US 10,422,393 B2
(45) Date of Patent: Sep. 24, 2019

(54) ANCHOR BRACKET FOR USE IN A DISC BRAKE ASSEMBLY, DISC BRAKE ASSEMBLY INCLUDING SUCH AN ANCHOR BRACKET AND METHOD FOR PRODUCING SUCH AN ANCHOR BRACKET

(71) Applicant: Kelsey-Hayes Company, Livonia, MI (US)

(72) Inventor: Anthony Schmandt, Livonia, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 15/557,523

(22) PCT Filed: Mar. 11, 2016

(86) PCT No.: PCT/US2016/021934
§ 371 (c)(1),
(2) Date: Sep. 12, 2017

(87) PCT Pub. No.: WO2016/149068
PCT Pub. Date: Sep. 22, 2016

(65) Prior Publication Data
US 2018/0045259 A1   Feb. 15, 2018

Related U.S. Application Data

(60) Provisional application No. 62/132,544, filed on Mar. 13, 2015.

(51) Int. Cl.
*F16D 65/00*  (2006.01)
*F16D 65/095* (2006.01)
*F16D 55/227* (2006.01)
*F16D 55/00*  (2006.01)
*F16D 65/18*  (2006.01)

(52) U.S. Cl.
CPC ......... *F16D 65/095* (2013.01); *F16D 55/227* (2013.01); *F16D 65/0056* (2013.01); *F16D 65/18* (2013.01); *F16D 2055/0008* (2013.01); *F16D 2250/003* (2013.01); *F16D 2250/0007* (2013.01); *F16D 2250/0084* (2013.01)

(58) Field of Classification Search
CPC .. F16D 65/0056; F16D 65/095; F16D 55/227; F16D 2055/0008; F16D 2250/0007; F16D 2250/0084; F16D 2250/003; F16D 65/18
USPC ...................... 188/72.1, 73.31, 73.36, 73.38
See application file for complete search history.

(56) References Cited

U.S. PATENT DOCUMENTS 6,047,795 A * 4/2000 Kobayashi ........ F16D 55/22655
188/73.43
6,719,105 B1 * 4/2004 Wemple ................ F16D 65/097
188/205 A (Continued)

*Primary Examiner* — Thomas W Irvin
(74) *Attorney, Agent, or Firm* — MacMillan, Sobanski & Todd, LLC

(57) ABSTRACT

An anchor bracket for use in a disc brake assembly comprises first and second arms, first and second windows, and first and second rotor channels. The first arm has a first rotor notch and the second arm has a second rotor notch. The first window is cast in the first arm and the second window is cast in the second arm. The first rotor channel is machined from the first rotor notch to the first window and the second rotor channel is machined from the second rotor notch to the second window.

16 Claims, 4 Drawing Sheets

(56) References Cited

U.S. PATENT DOCUMENTS

| | | | | |
|---|---|---|---|---|
| 7,299,903 B2* | 11/2007 | Rockwell | ............ | F16D 65/0972 |
| | | | | 188/73.36 |
| 7,644,809 B2* | 1/2010 | Cortinovis | .......... | F16D 65/0972 |
| | | | | 188/205 A |
| 8,397,880 B2* | 3/2013 | Chelaidite | ........... | F16D 65/0972 |
| | | | | 188/73.31 |
| 8,714,317 B1* | 5/2014 | Mackiewicz | ....... | F16D 65/0056 |
| | | | | 188/73.31 |
| 8,869,950 B2* | 10/2014 | Maehara | ............... | F16D 55/227 |
| | | | | 188/73.38 |
| 9,284,999 B2* | 3/2016 | Gerber | .............. | F16D 55/22655 |
| 9,360,066 B2* | 6/2016 | Zenzen | ................... | B23P 15/18 |
| 9,422,992 B2* | 8/2016 | Bach | ................... | F16D 65/0972 |
| 9,777,783 B2* | 10/2017 | Asahi | .................. | F16D 65/0972 |
| 9,822,833 B2* | 11/2017 | Mallmann | ........... | F16D 65/0972 |
| 2011/0120821 A1* | 5/2011 | Shimamura | ......... | F16D 65/0972 |
| | | | | 188/234 |
| 2012/0067678 A1 | 3/2012 | Andrews et al. | | |

* cited by examiner

ANCHOR BRACKET FOR USE IN A DISC BRAKE ASSEMBLY, DISC BRAKE ASSEMBLY INCLUDING SUCH AN ANCHOR BRACKET AND METHOD FOR PRODUCING SUCH AN ANCHOR BRACKET

CROSS REFERENCE TO RELATED APPLICATION

This application claims priority to, and the benefit of, U.S. Provisional Application Ser. No. 62/132,544, filed Mar. 13, 2015, the full disclosure of which is incorporated herein by reference in entirety.

BACKGROUND OF INVENTION

This invention relates in general to vehicle disc brake assemblies and in particular to an improved anchor bracket for use in such a vehicle disc brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when a driver of the vehicle depresses a brake pedal. The structures of these drum brake assemblies and disc brake assemblies, as well as the actuators therefore, are well known in the art.

A typical disc brake assembly includes a rotor which is secured to a wheel of the vehicle for rotation therewith. The disc brake assembly further includes a brake caliper which is slidably supported on pins secured to an anchor or brake carrier bracket. The anchor bracket is secured to a non-rotatable component of the vehicle, such as the axle flange or steering knuckle, which is connected to the vehicle frame. The caliper includes a pair of brake shoes which are disposed on opposite sides of the rotor. The brake shoes are connected to one or more hydraulically or pneumatically actuated pistons for movement between a non-braking position, wherein the brake shoes are spaced apart from the opposite sides of the rotor, and a braking position, wherein the brake shoes are moved into frictional engagement with opposed braking surfaces of the rotor. For example, when the driver of the vehicle depresses the brake pedal, the piston urges the brake linings from the non-braking position to the braking position so as to frictionally engage the opposed braking surfaces of the brake disc and thereby slow or stop rotation of the associated wheel of the vehicle.

Typically, the anchor bracket includes a pair of arms interconnected by an inner tie. In some instances, the anchor bracket may also include an outer tie that also connects the arms. The anchor bracket includes two pairs of holes. One of the pairs of holes is adapted to receive bolts for securing the anchor bracket to the non-rotatable component of the vehicle. The other pair of holes is adapted to receive bolts or pins for slidably supporting the caliper relative to the anchor bracket. The arms of the anchor bracket have guide rails formed thereon. The guide rails are adapted to support a pair of friction pad assemblies for sliding movement. The friction pad assemblies include the brake shoes. During braking, the anchor bracket functions to transmit the braking torque through the associated vehicle component to the vehicle frame.

The arms straddle the rotor such that the rotor is positioned in a rotor channel provided in each of the arms. Typically, the anchor brackets are cast and then "finish" machined. Constraints of the casting processes prevent the "finished" rotor channels from being cast into the anchor brackets. Thus, the rotor channels are machined into the anchor bracket after the casting process. However, machining the rotor channels after casting increases production complexity and cost for the anchor bracket. Therefore, it would be desirable to reduce the amount of machining required for the rotor channels.

SUMMARY OF INVENTION

This invention relates to an anchor bracket and method for producing such an anchor bracket wherein the anchor bracket includes, in an as-cast condition, at least one cast window to limit or localize machining and/or a filled in rotor passage area for a molding condition.

According to one embodiment, a method for producing an anchor bracket for use in a disc brake assembly may comprise, individually and/or in combination, one or more of the following features: providing an anchor bracket in an as-cast condition and machining first and second rotor channels. The anchor bracket has first and second arms, a first window through the first arm, a second window through the second arm, and at least one tie rod connecting the first and second arms. The first rotor channel is machined in the first arm and the second rotor channel is machined in the second arm. The machining is limited by the first and second windows.

According to another embodiment, an anchor bracket for use in a disc brake assembly may comprise, individually and/or in combination, one or more of the following features: first and second arms, first and second windows, and first and second rotor channels. The first arm has a first rotor notch and the second arm has a second rotor notch. The first window is cast in the first arm and the second window is cast in the second arm. The first rotor channel is machined from the first rotor notch to the first window and the second rotor channel is machined from the second rotor notch to the second window.

According to another embodiment, an anchor bracket for use in a disc brake assembly may comprise, individually and/or in combination, one or more of the following features: first and second arms, first and second windows, and tie rods. The first window is through the first arm and has a first perimeter fully bordered by the first arm. The second window is through the second arm and has a second perimeter fully bordered by the second arm. The tie rods connect the first and second arms.

According to another embodiment, a disc brake assembly includes the anchor bracket of this invention.

A potential advantage of an embodiment is reducing machining required for the rotor channels. Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
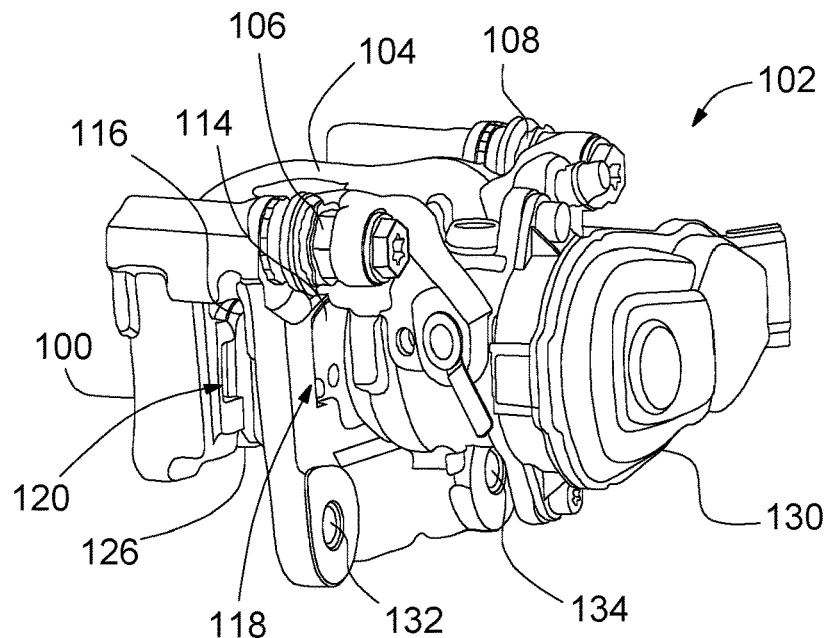
FIG. 1 is a perspective view of a disc brake assembly using an anchor bracket in accordance with the present invention.
Figure 2:
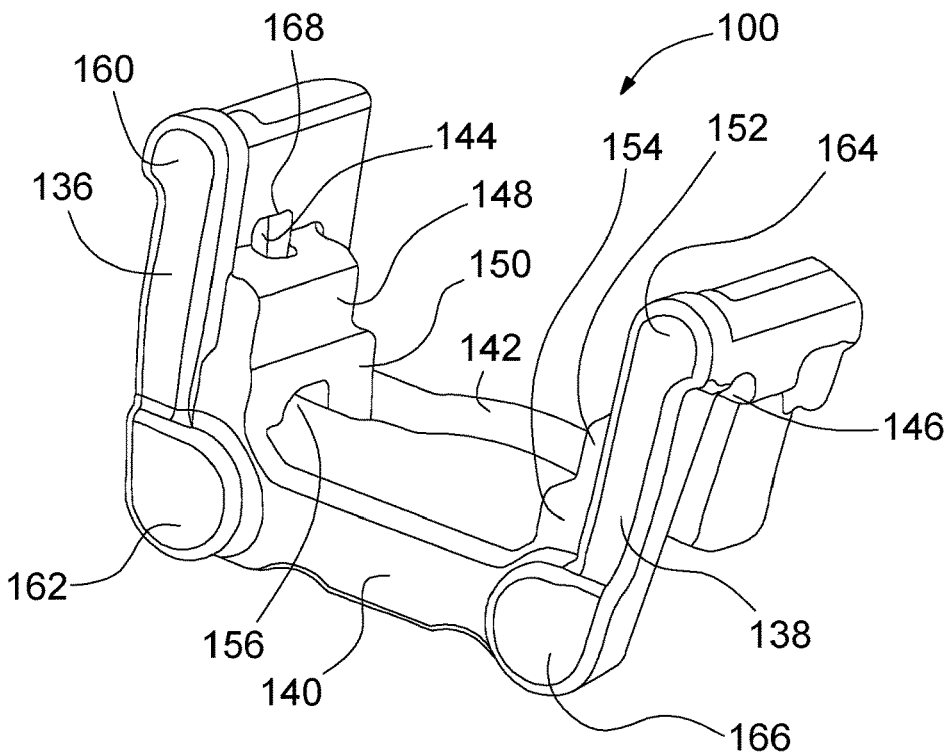
FIG. 2 is a perspective view of the anchor bracket of FIG. 1 in an as-cast condition.
Figure 3:
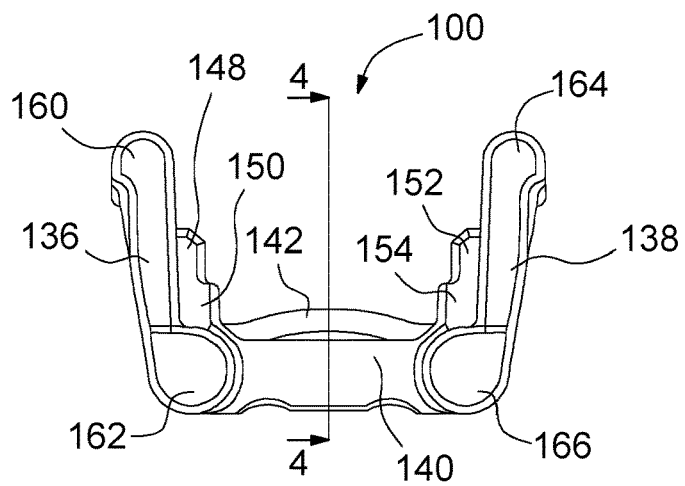
FIG. 3 is a side elevation view of the anchor bracket of FIG. 1 in the as-cast condition.
Figure 4:
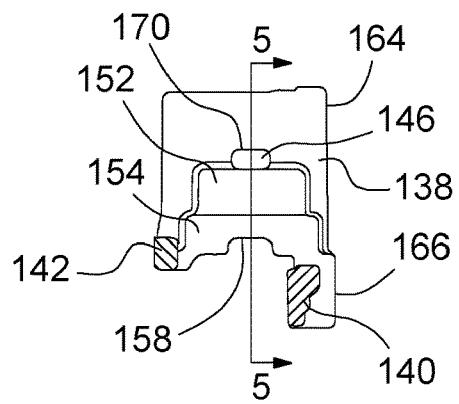
FIG. 4 is a sectional view taken along line 4-4 of FIG. 3.

Referring now to FIG. 1, there is illustrated an anchor bracket 100 for use with a disc brake assembly, indicated generally at 102. The general structure and operation of the disc brake assembly 102 is well known in the prior art. For example, the disc brake assembly 102 may be such as is disclosed by U.S. Patent Publication No. 2012/0067678 to Andrews et al, the disclosure of which is hereby incorporated by reference in entirety herein. Although this invention will be described and illustrated in connection with the particular disc brake assembly 102 disclosed herein, it will be appreciated that this invention may be used in connection with other types or kinds of disc brake assemblies, if so desired.

Figure 5:
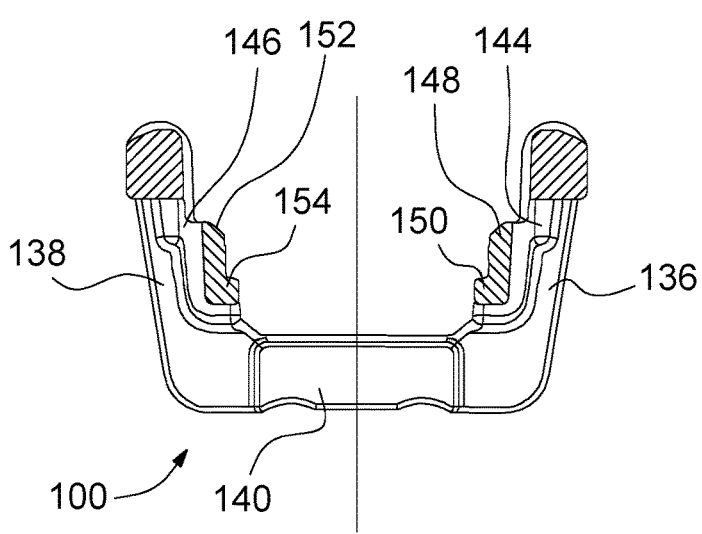
FIG. 5 is a sectional view taken along line 5-5 of FIG. 4.
Figure 6:
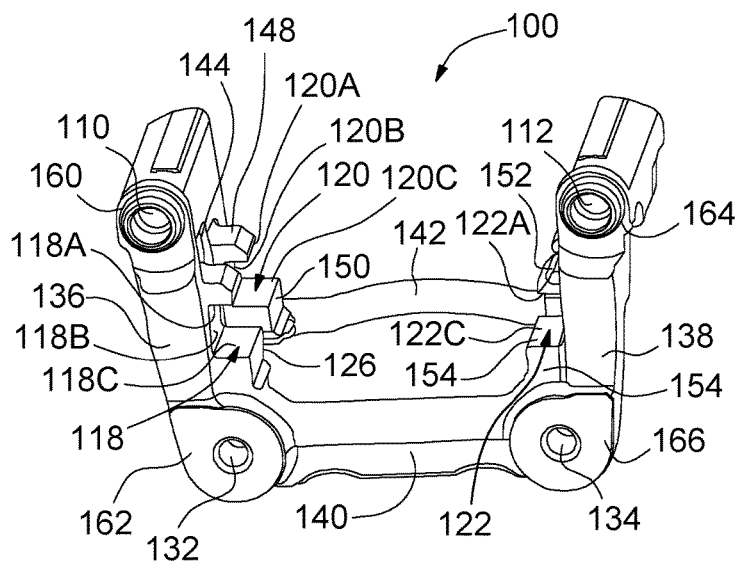
FIG. 6 is a perspective view of the anchor bracket of FIG. 1, machined from the as-cast condition.
Figure 7:
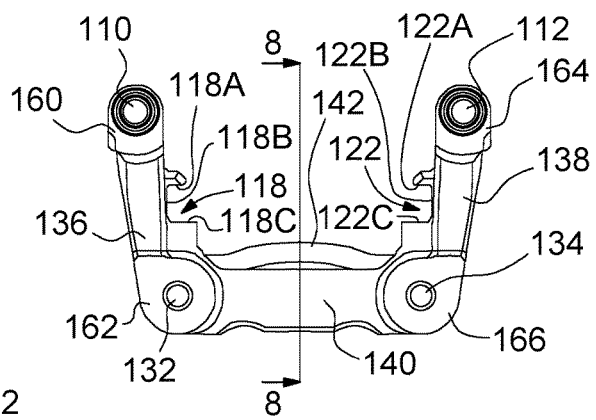
FIG. 7 is a side elevation view of the anchor bracket of FIG. 6.
Figure 8:
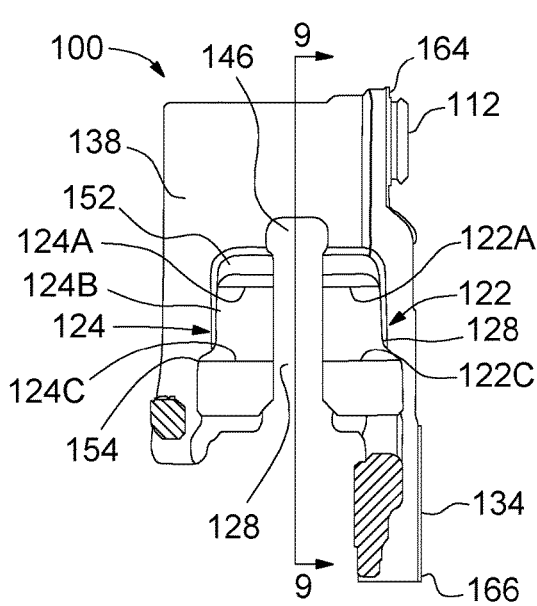
FIG. 8. is a sectional view taken along line 8-8 of FIG. 7.

The disc brake assembly 102 includes a brake caliper 104 to which first and second guide pins 106 and 108, respectively, are secured. The anchor bracket 100 has first and second guide pin holes 110 and 112, respectively (illustrated in FIG. 5). The first guide pin 106 extends into the first guide pin hole 110 and the second guide pin 108 extends into the second guide pin hole 112 such that the caliper 104 is slidably supported on the anchor bracket 100.

The disc brake assembly 102 also includes first and second brake shoes 114 and 116, respectively, and first, second, third, and fourth guide rails, indicated generally at 118, 120, 122, and 124, respectively, in the anchor bracket 100 (the third and fourth guide rails 122 and 124, respectively, are best illustrated are in FIGS. 6-9). The first brake shoe 114 is mounted on the first and third guide rails 118 and 122, respectively, and the second brake shoe 116 is mounted on the second and fourth guide rails 120 and 124, respectively. The first brake shoe 114 may be part of a first friction pad assembly and the second brake shoe 116 may be part of a second friction pad assembly. Although not illustrated, brake clips may be provided between the first, second, third, and fourth guide rails 118, 120, 122, and 124, respectively, and the first and second brake shoes 114 and 116, respectively.

Figure 9:
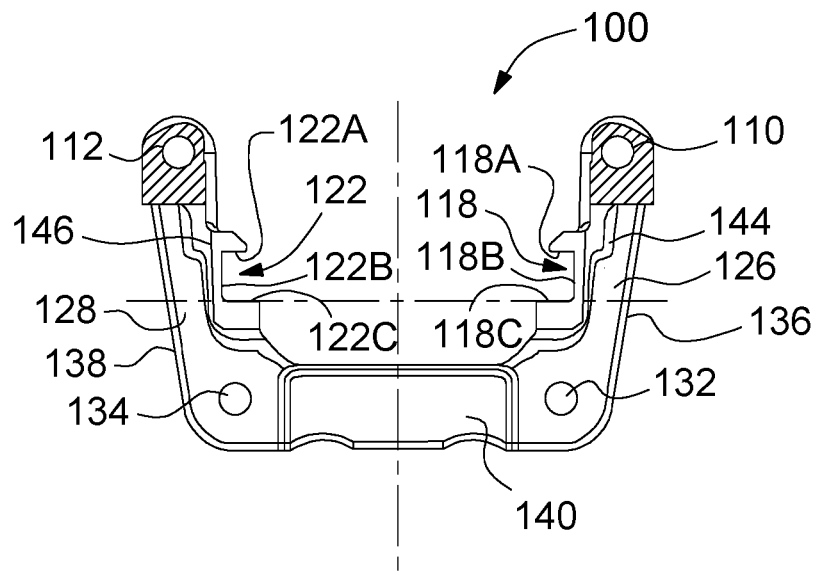
FIG. 9. is a sectional view taken along line 9-9 of FIG. 8.

The anchor bracket 100 further includes first and second rotor channels 126 and 128, respectively (the second rotor channel 128 is best illustrated in FIG. 9) through which a rotor (not illustrated) that is frictionally engaged by the first and second brake shoes 114 and 116, respectively, passes.

The disc brake assembly 102 further includes an actuator 130. As illustrated, the actuator 130 is an electromechanical actuator; however, the actuator 130 may be otherwise as known in the art. First and second mounting holes 132 and 134, respectively, allow mounting of the anchor bracket 100 to a non-rotatable component of a vehicle employing the disc brake assembly 102.

Referring now to FIGS. 2-9, there is illustrated the anchor bracket 100. In FIGS. 2-5, the anchor bracket 100 is in an as-cast condition. The anchor bracket 100 of FIG. 1 and illustrated in FIGS. 6-9 is "finish" machined from the as-cast condition illustrated in FIGS. 2-5.

The anchor bracket 100 has first and second axially and outwardly extending arms 136 and 138, respectively. The first and second arms 136 and 138, respectively, are generally symmetric. As such, discussion of one of the first or second arms 136 or 138, respectively, is also applicable to the other of the first or second arms 136 or 138, respectively, and vice versa. When the anchor bracket 100 is in the as-cast condition, areas where the first and second rotor channels 126 and 128, respectively, to be later machined are filled with as-cast material, typically cast iron or any other suitable desired material. The first and second arms 136 and 138, respectively, are connected by first and second tie bars 140 and 142, respectively. Alternatively, one of the first or second tie bars 140 and 142, respectively, may be omitted.

Cast into the first arm 136 is a first "through" opening or window 144 and cast into the second arm 138 is a second "through" opening or window 146. The first arm 136 is also cast with first and second shoulder portions 148 and 150, respectively, with the first shoulder portion 148 stepped back from the second shoulder portion 150. Similarly, the second arm 138 is cast with third and fourth shoulder portions 152 and 154, respectively, with the third shoulder portion 152 stepped back from the fourth shoulder portion 154. The first arm 136 is cast with a first rotor notch 156 and the second arm 138 is cast with a second rotor notch 158. The anchor bracket 100 is also cast with first, second, third, and fourth surfaces 160, 162, 164, and 166, respectively.

A first perimeter 168 extends around the first window 144. Before machining of the anchor bracket 100, the first perimeter 168 is fully bordered by the first arm 136. Similarly, a second perimeter 170 extends around the second window 146 and, before machining of the anchor bracket 100, the second perimeter 170 is fully bordered by the second arm 138.

As discussed above, in FIGS. 6-9 the anchor bracket 100 is illustrated after "finish" machining from the as-cast condition illustrated in FIGS. 2-5. The first rotor channel 126 is machined in the first arm 136 from the first rotor notch 156 to the first window 144 and through the first and second shoulders 148 and 150, respectively. Similarly, the second rotor channel 128 is machined from the second rotor notch 158 to the second window 146 and through the third and fourth shoulders 152 and 154, respectively. The first and second guide rails 118 and 120, respectively, are machined in the first arm 136 between the first and second shoulders. The third and fourth guide rails 122 and 124, respectively, are machined in the second arm 138 between the third and fourth shoulders.

The first rotor channel 126 divides the first and second guide rails 118 and 120, respectively, and the second rotor channel 128 divides the third and fourth guide rails 122 and 124, respectively. The first and second guide rails 118 and 120, respectively, are coaxially aligned across the first rotor channel 126. Similarly, the third and fourth guide rails 122 and 124, respectively, are coaxially aligned across the second rotor channel 128.

Each of the first, second, third, and fourth guide rails 118, 120, 122, and 124, respectively, is illustrated as a c-shaped recess. Alternatively, any of the first, second, third, and fourth guide rails 118, 120, 122, and 124, respectively, may be other than a c-shaped recess. The first guide rail 118 has an upper surface 118A machined into the first shoulder 148, a back surface 118B machined into the first and second shoulders 148 and 150, respectively, and a lower surface 118C machined into the second shoulder 150. The second guide rail 120 has an upper surface 120A machined into the first shoulder 148, a back surface 120B machined into the first and second shoulders 148 and 150, respectively, and a lower surface 120C machined into the second shoulder 150. The third guide rail 122 has an upper surface 122A machined into the third shoulder 152, a back surface 122B machined into the third and fourth shoulders 152 and 154, respectively, and a lower surface 122C machined into the fourth shoulder 154. The fourth guide rail 124 has an upper surface 124A machined into the third shoulder 152, a back surface 124B machined into the third and fourth shoulders 152 and 154, respectively, and a lower surface 124C machined into the fourth shoulder 154.

The first guide pin hole 110 is machined in the first surface 160, the first mounting hole 132 is machined in the second surface 162, the second guide pin hole 112 is machined in the third surface 164, and the second mounting hole 134 is machined in the fourth surface 166.

Figure 10:
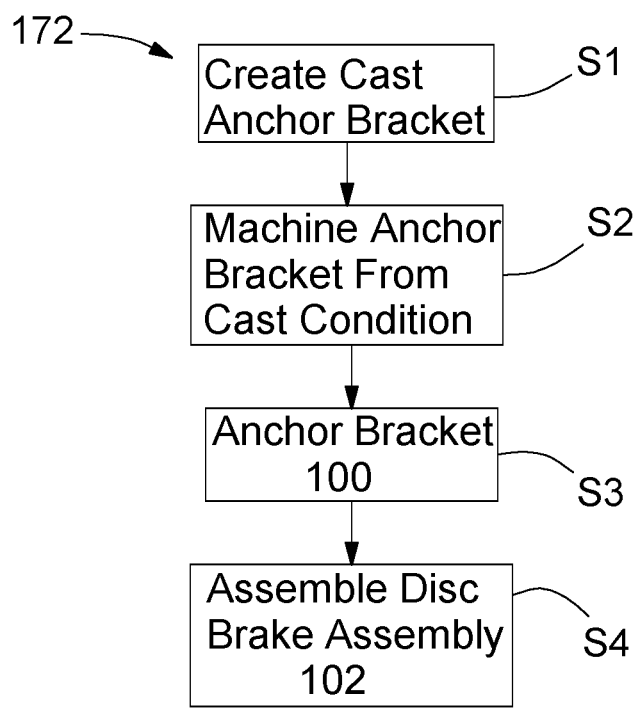
FIG. 10. is a flow chart of a method of machining the anchor bracket of FIG. 1 from the as-cast condition.

Referring now to FIG. 10, there is illustrated a method, indicated generally at 172, for producing the anchor bracket 100 and disc brake assembly 102.

In a step S1, the anchor bracket 100 is created in the as-cast condition. Typically, the anchor bracket 100 is cast into the as-cast condition.

In a step S2, the anchor bracket 100 is machined from the as-cast condition. The anchor bracket 100 is machined using an appropriate machining apparatus known to those skilled in the art. During machining, the first and second windows 144 and 146, respectively, limit or localize the machining apparatus for machining the first and second rotor channels 126 and 128, respectively. The first and second windows 144 and 146, respectively, may also limit or localize the machining apparatus when machining the first, second, third, and fourth guide rails 118, 120, 122, and 124, respectively.

In a step S3, the anchor bracket 100 is ready for assembly into the disc brake assembly 102. In a step S4, the disc brake assembly 102 is assembled from the anchor bracket 100 and the remaining components previously discussed.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A method for producing an anchor bracket for use in a disc brake assembly, the method comprising the steps of:
    providing an anchor bracket in an as-cast condition, the anchor bracket in the as-cast condition having:
        first and second arms;
        a first window through the first arm;
        a first notch in the first arm;
        a second window through the second arm;
        a second notch in the second arm;
        material connecting the first window to the first notch and connecting the second window to the second notch; and
        at least one tie rod connecting the first and second arms; and
    machining a first rotor channel in the first arm by removing the material connecting the first window to the first notch; and
    machining a second rotor channel in the second arm by removing the material connecting the second window to the second notch.

2. The method of claim 1 further comprising:
    machining first and second guide rails in the first arm and third and fourth guide rails in the second arm, wherein the machining of the first, second, third, and fourth guide rails is localized by the first and second windows.

3. The method of claim 2 wherein the first rotor channel is machined to divide the first and second guide rails and the second rotor channel is machined to divide the third and fourth guide rails.

4. The method of claim 2 wherein the first arm has first and second shoulder portions and the first and second guide rails are machined between the first and second shoulders and the second arm has third and fourth shoulder portions and the third and fourth guide rails are machined between the third and fourth shoulders.

5. The method of claim 4 wherein the first shoulder portion is stepped back from the second shoulder portion and the third shoulder portion is stepped back from the fourth shoulder portion.

6. The method of claim 4 wherein the first rotor channel is machined through the first and second shoulder portions and the second rotor channel is machined through the third and fourth shoulder portions.

7. The method of claim 2 wherein the first, second, third, and fourth guide rails are c-shaped recesses.

8. The method of claim 2 further comprising:
    mounting a first brake shoe on the first and third guide rails;
    mounting a second brake shoe on the second and fourth guide rails;
    securing guide pins to a brake caliper;
    machining mounting holes in the anchor bracket;
    machining guide pin holes in the anchor bracket; and
    inserting the guide pins in the guide pin holes.

9. The method of claim 8 further comprising:
    mounting an actuator on the brake caliper.

10. The method of claim 1 further comprising:
    a first perimeter around the first window, wherein the first perimeter is fully bordered by the first arm before machining of the first window; and
    a second perimeter around the second window, wherein the second perimeter is fully bordered by the second arm before machining of the second window.

11. The method of claim 1 wherein the first and second guide rails are coaxial and the third and fourth guide rails are coaxial.

12. The method of claim 1 further comprising:
    machining a first guide pin hole and a first mounting hole in the first arm;
    machining a second guide pin hole and a second mounting hole in the second arm.

13. The method of claim 1 further comprising:
    machining first and second guide rails in the first arm and third and fourth guide rails in the second arm, wherein the machining of the first, second, third, and fourth guide rails is localized by the first and second windows.

14. The method of claim 13 wherein the first rotor channel is machined to divide the first and second guide rails and the second rotor channel is machined to divide the third and fourth guide rails.

15. The method of claim 13 wherein the first arm has first and second shoulder portions and the first and second guide rails are machined between the first and second shoulders and the second arm has third and fourth shoulder portions and the third and fourth guide rails are machined between the third and fourth shoulders.

16. A method for producing an anchor bracket for use in a disc brake assembly, the method comprising the steps of:
   providing an anchor bracket in an as-cast condition, the anchor bracket in the as-cast condition having:
      first and second arms;
      a first window through the first arm;
      a second window through the second arm;
      material connecting the first window to an opened lower end of the first arm and connecting the second window to an opened lower end of the second arm;
      at least one tie rod connecting the first and second arms; and
   machining a first rotor channel in the first arm by removing the material connecting the first window to the opened lower end of the first arm; and
   machining a second rotor channel in the second arm by removing the material connecting the second window to the opened lower end of the second arm.

* * * * *